(No Model.)
G. H. MACKAY.
TIRE FOR VEHICLE WHEELS.
No. 550,414. Patented Nov. 26, 1895.
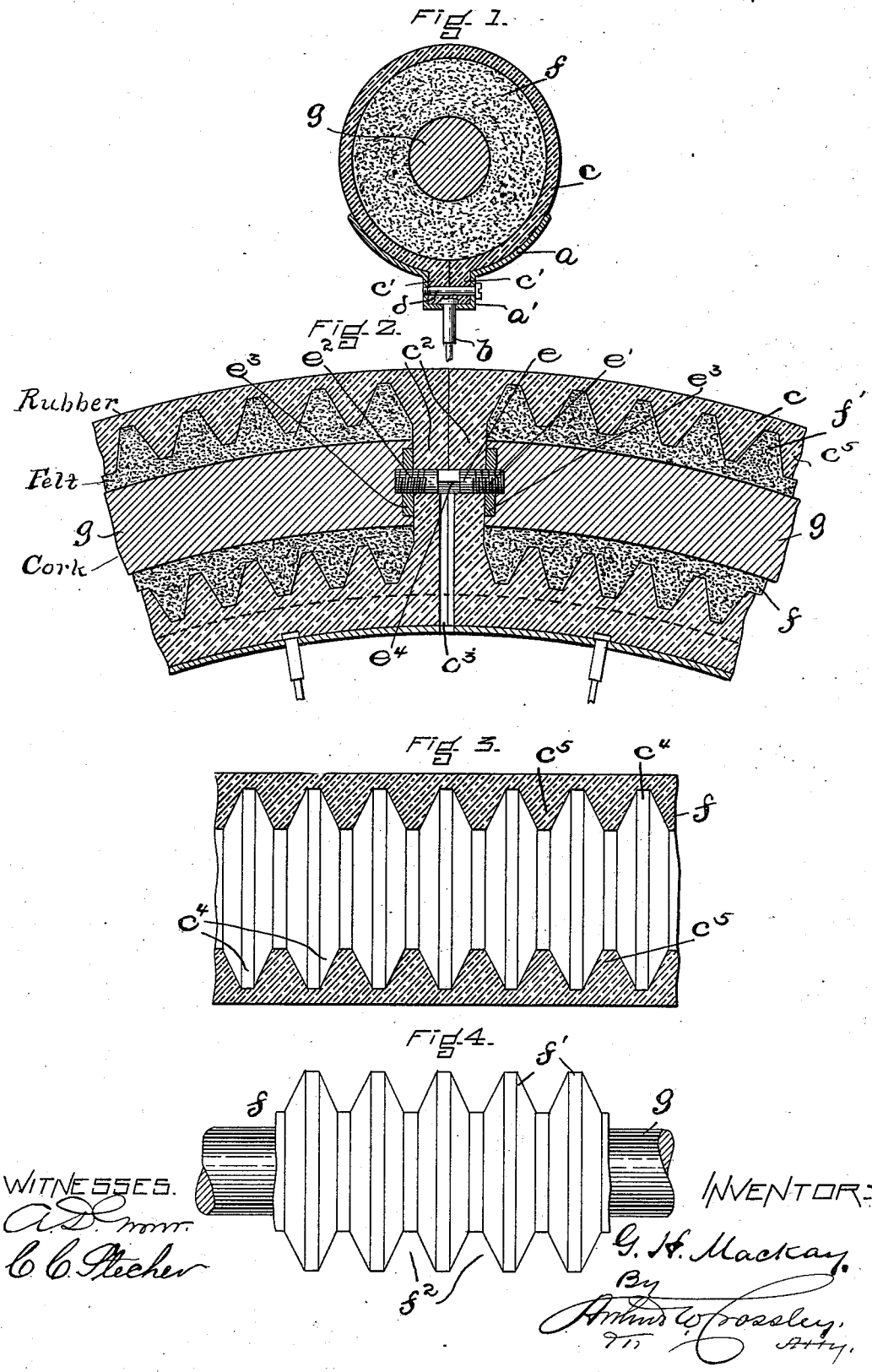

UNITED STATES PATENT OFFICE.

GEORGE H. MACKAY, OF SALEM, NEW HAMPSHIRE, ASSIGNOR OF ONE-HALF TO CHARLES F. KIMBALL AND FRED C. BUXTON, OF SAME PLACE.

TIRE FOR VEHICLE-WHEELS.

SPECIFICATION forming part of Letters Patent No. 550,414, dated November 26, 1895.

Application filed February 5, 1895. Serial No. 537,330. (No model.)

*To all whom it may concern:*

Be it known that I, GEORGE H. MACKAY, of Salem, in the county of Rockingham and State of New Hampshire, have invented certain new and useful Improvements in Tires for Vehicle-Wheels, of which the following is a specification.

This invention has relation to that class of tires for bicycle-wheels known as "cushion-tires," a tire of this kind usually consisting of a rubber tube having sufficient thickness to maintain its shape and at the same time being sufficiently elastic to yield in traversing irregular surfaces, so as to have a cushioning effect, which obviates jolting.

By my invention I am enabled to considerably reduce the thickness of the rubber in the tube without decreasing the stability of the tire, a novel arrangement for filling the interior of the tube being employed, which, while properly sustaining the tube, neither detracts from its elasticity and cushioning property nor increases the weight of the tire.

The accompanying drawings illustrate an embodiment of the invention.

Figure 1 shows a cross-section of the tire. Fig. 2 shows a longitudinal section of a portion of the tire, the line upon which the section is taken being slightly out of the plane upon which the rubber tube is divided in its lower part. Fig. 3 shows a longitudinal section of a portion of the rubber tube. Fig. 4 shows a portion of the filling for the rubber tube in side elevation.

The letter $a$ designates the metal rim of the wheel, which rim is for the most part concavo-convex in cross-section and is formed with a central longitudinal channel $a'$, which projects inwardly and in the base of which the spokes $b$ are fastened.

The rubber tube $c$ seats on the outer concave side of the rim, as usual, and in this case is divided longitudinally on the inner side and formed with abutting flanges $c'$ at opposite sides of the division, which flanges occupy the channel $a'$. The tube is securely fastened to the rim by bolts $d$, passed through the sides of the channel $a'$ and through the flanges $c'$, the screw-threaded ends of the bolts engaging screw-threaded holes in one side of the said channel and the heads of the bolts coming against the other side thereof, as clearly shown in Fig. 1.

The ends of the rubber tube are closed, as shown at $c^2$, and are brought together and so held by means of a bolt $e$ extending through them and having right and left hand screw-threads $e'$ and $e^2$ and nuts $e^3$, screwing onto said threads and bearing against the inner sides of the tube ends $c^2$. The central portion of the bolt is square, as shown at $e^4$, and there is an opening $c^3$ in the tube between its ends of sufficient size to admit a tool for engagement with said square portion of the bolt to turn the latter and tighten the nuts $e^3$.

On the interior the rubber tube is corrugated to form alternating annular ribs $c^4$ and grooves $c^5$.

A tube $f$, of felt, fits within the rubber tube $c$ and is corrugated on the exterior to form alternating annular ribs $f'$ and grooves $f^2$, which interlock with the interior ribs $c^4$ and grooves $c^5$ of the rubber tube. By this mode of interlocking the rubber tube and the felt tube these parts are thoroughly united throughout, and the same means which hold the ends of the rubber tube together hold the felt tube in place.

The interior of the felt tube is filled by a core $g$, of cork, which material is employed on account of its being light as well as elastic.

It will be seen that by the construction above described the object primarily stated of providing a cushion-tire in which the amount of rubber is reduced and the stability of the tire at the same time maintained without increasing its weight is satisfactorily accomplished.

Having thus explained the nature of the invention and described a way of constructing and using the same, though without attempting to set forth all of the forms in which it may be made or all of the modes of its use, it is declared that what is claimed is—

1. A cushion-tire composed of an outer rubber tube corrugated on the interior, a felt tube inside the rubber tube and correspondingly corrugated to interlock with said rubber tube, and a core in the felt tube.

2. A cushion-tire composed of a length of rubber tubing having its ends brought together, means for connecting said ends, an inner tube of fibrous material, as felt, interlocked with the rubber tube, and a core in the said inner tube.

3. A cushion-tire composed of an outer rubber tube having closed ends which are brought together, a bolt passing through said ends and having right and left hand screw-threads, nuts engaging said threads and bearing against the inner sides of the tube-ends, an inner tube of fibrous material interlocked with the rubber tube, and a core in the inner tube.

4. A cushion-tire composed of an outer rubber tube divided along its inner side and internally corrugated, an inner tube of fibrous material corrugated for engagement with the outer tube, and a core in said inner tube.

5. The combination of a concavo-convex wheel-rim having a central longitudinal channel, a rubber tube seating on said rim and divided along the inner side and formed with flanges at opposite sides of the division, said flanges occupying the channel of the rim, fastenings passed through the channel and the flanges, an inner tube of fibrous material interlocked with the rubber tube, and a core in the said inner tube.

In testimony whereof I have signed my name to this specification, in the presence of two subscribing witnesses, this 6th day of January, A. D. 1895.

GEO. H. MACKAY.

Witnesses:
ARTHUR W. CROSSLEY,
C. C. STECHER.